Oct. 22, 1940.   F. C. BEST   2,218,634
MOTOR VEHICLE
Filed March 10, 1938   2 Sheets-Sheet 1
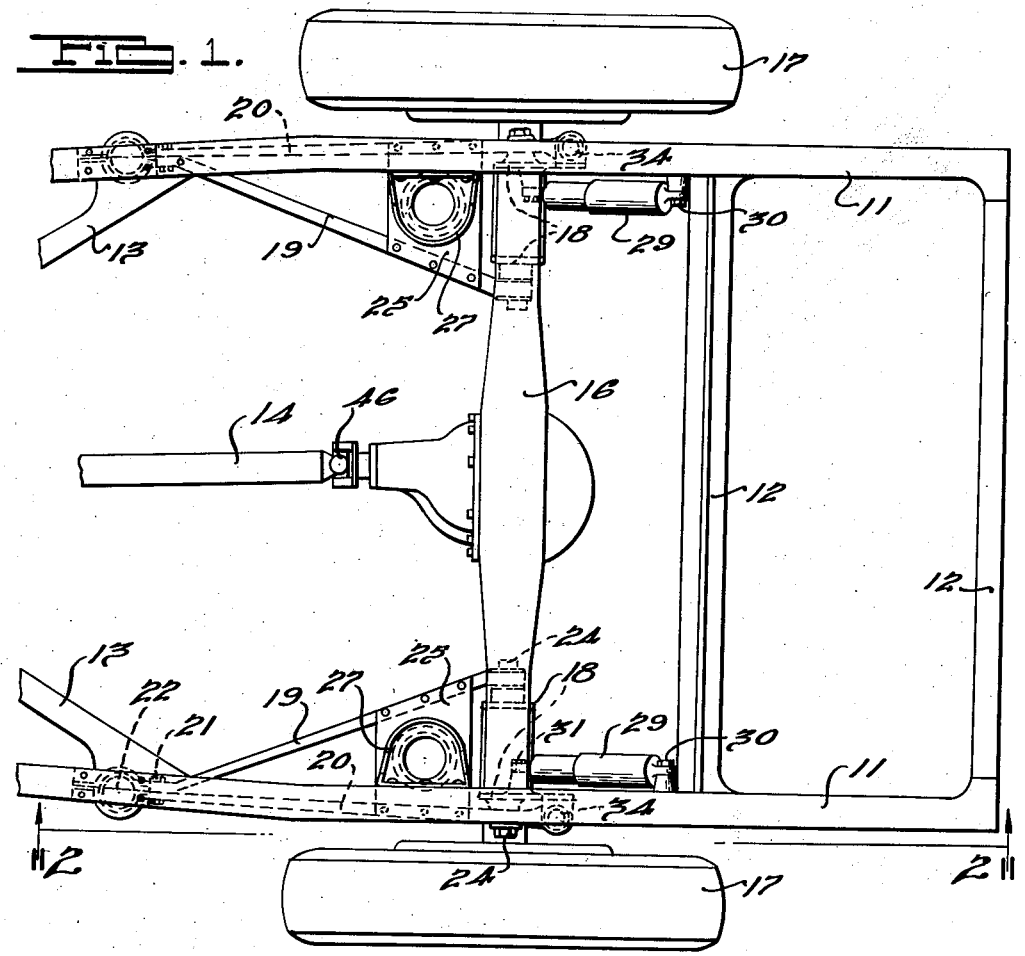
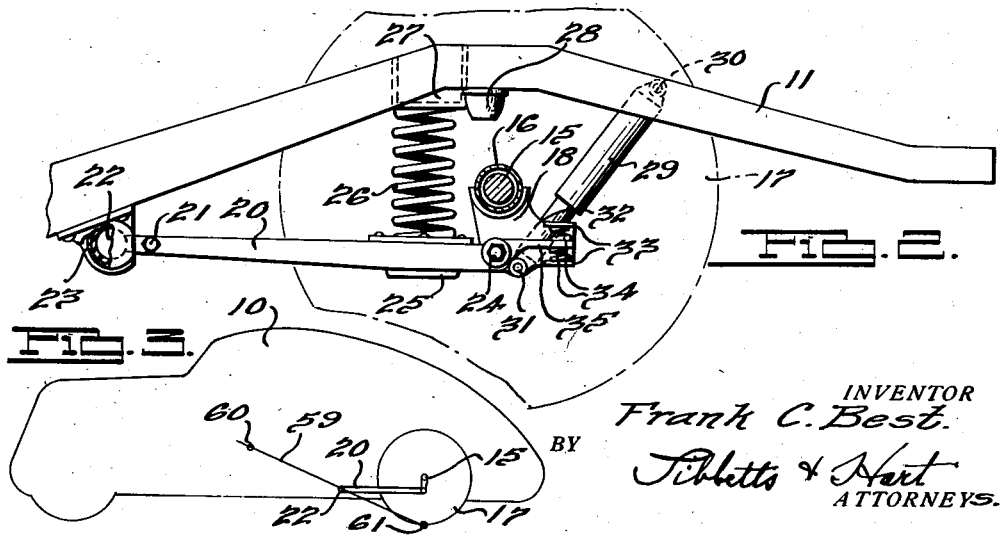
INVENTOR
Frank C. Best.
BY
Tibbetts & Hart
ATTORNEYS.

Oct. 22, 1940.  F. C. BEST  2,218,634
MOTOR VEHICLE
Filed March 10, 1938  2 Sheets-Sheet 2
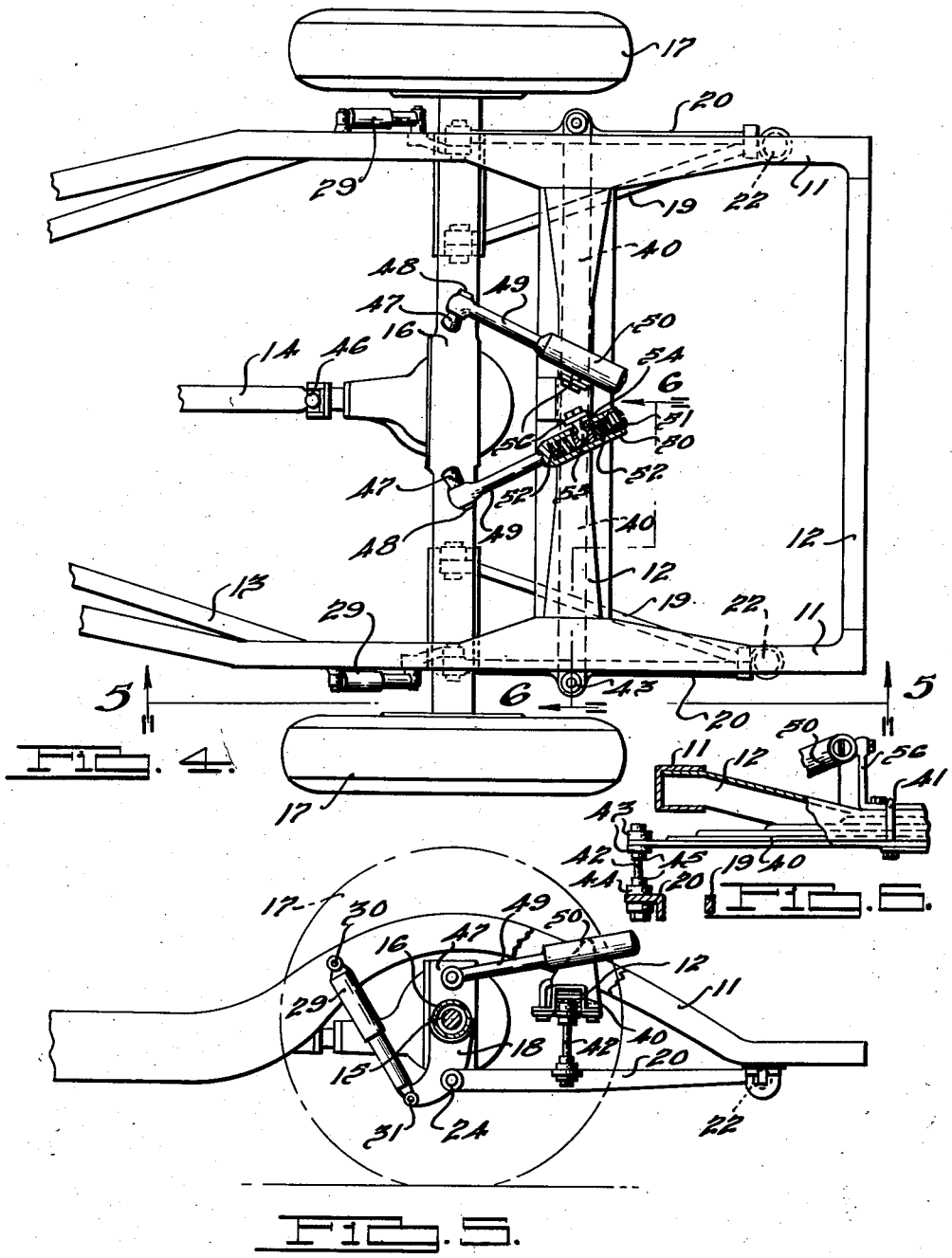

Patented Oct. 22, 1940

2,218,634

UNITED STATES PATENT OFFICE 2,218,634

MOTOR VEHICLE

Frank C. Best, Detroit, Mich., assignor to Packard Motor Car Company, Detroit, Mich., a corporation of Michigan Application March 10, 1938, Serial No. 195,044

16 Claims. (Cl. 267—20)

This invention relates to motor vehicles and more particularly to suspension mechanism.

One of the objects of the invention is to provide rear suspension for motor vehicles that will give maximum riding comfort.

Another object of the invention is to provide a rear suspension mechanism of a character that will permit the body to be carried close to the ground without the necessity of tunneling the body to allow for propeller shaft movement in a vertical direction.

A further object of the invention is to provide connections between the driving axle and the frame of a motor vehicle that will serve to take torque reaction and driving thrust forces, to act as spring supporting levers, to resist lateral body displacement, and to assist in resisting body side tilt.

Another object of the invention is to provide connecting mechanisms between the driving axle structure and the frame of a motor vehicle that will serve to resist movement of the axle out of a definite driving position, that will transmit the drive from the axle to the frame structure, that will effectively resist diving of the frame upon brake application, and that will limit frame roll within safe limits.

Other objects of the invention will appear from the following description taken in connection with the drawings, which form a part of this specification, and in which:

Fig. 1 is a plan view of the rear end of a motor vehicle chassis incorporating suspension mechanism forming the subject matter of this invention;

Fig. 2 is a sectional view of the same taken on line 2—2 of Fig. 1;

Fig. 3 is a diagrammatic showing of a motor vehicle having the invention incorporated therewith;

Fig. 4 is a plan view of the rear end of a motor vehicle chassis having a modified form of the invention incorporated therewith;

Fig. 5 is a sectional view taken on line 5—5 of Fig. 4;

Fig. 6 is a sectional view taken on line 6—6 of Fig. 4.

The body of a motor vehicle, as indicated at 10 in Fig. 3, is suitably fixed on a support consisting of a frame having longitudinally extending side sills 11 joined by transversely extending members 12 and diagonally extending members 13.

Beneath the frame and extending longitudinally thereof is a propeller shaft 14 connected by a universal joint 46 to driving axle 15 extending transversely beneath the frame. The driving axle is carried by housing 16 and forms therewith the axle structure. Driving wheels 17 are fixed on the ends of the driving axle, one on each side of the frame.

Between the axle structure and the body carrying frame is provided connecting mechanisms that serve a plurality of purposes. To the underside of the axle housing, in spaced relation transversely of the vehicle, is fixed a plurality of pedestals or brackets 18, and between such pedestals and the frame are two connecting mechanisms, in the form of V-links, each consisting of arms 19 and 20 secured together by suitable means such as bolts 21. The adjacent ends of such arms are semi-spherical in form to provide a ball terminal or pivot 22. Such ball terminals are carried in rubber bushings mounted in socket brackets 23 suitably fixed to the underside of the side sills of the vehicle frame, and the arrangement is such that the link structures normally lie in a horizontal plane substantially parallel with the ground. Each pedestal carries a journal 24 on which the spaced ends of the arms of the links are pivotally mounted. Between the arms of each link is a spring seat 25 in the form of a plate having a depression therein for receiving the coil spring 26. Above the spring seats on the links and secured to the main frame are seat abutments 27 with which the upper ends of the springs are engaged. In order to limit the upward movement of the axle structure, rubber abutments 28 are fixed to the underside of the main frame in the path of the vertical movement of the axle structure.

In Figs. 1 to 3 inclusive, the ball ends of the links are located in advance of the axle, while in Figs. 4 to 6 inclusive, the ball ends of the links are located rearwardly of the axle structure. Preferably the outside legs 20 of the link structure extend in line with the side sills of the frame thereabove.

Between each of the outer pedestals and the frame is arranged a direct acting conventional shock absorber 29 of the telescoping type. The shock absorbers have an upper pivotal connection 30 with the adjacent side sill and a lower pivotal connection 31 with the adjacent outer pedestal 18. The journals for the shock absorbers on the pedestals are arranged preferably beyond the journal of the adjacent link arm and preferably in a plane slightly therebelow. Such shock absorbers are also preferably arranged to extend so that their axes extend normal to the lever arm defined by the connections of the links and the connections thereof with the pedestals.

The outer pedestals shown in Figs. 1 and 2 are each formed with an extended portion 32 having vertically spaced flanges 33 forming abutments for a pair of heavily loaded opposed coil springs 34. The outer link arms 20 are formed with portions 35 extending beyond the pivotal connection with the pedestals that are of a length to extend between and be engaged by the adjacent loaded pair of coil springs 34.

In Figs. 4 to 6 inclusive, a leaf spring 40 is used instead of the coil springs 26 shown in the preferred embodiment of the invention. Such spring extends transversely of the vehicle preferably below the cross frame element 12 adjacent the rear axle structure and is centrally secured thereto by U-bolts 41. Between the outer ends of this spring and the outer arms 20 of the links are connections in the form of bolts 42 having two pair of rubber washers 43 and 44 surrounding the same, the washers 43 being disposed above and below the ends of the spring, and the washers 44 being disposed above and below the link arms 20. On each of the bolts is provided a pair of fixed abutments 45 providing a definite spacing between the spring ends and the link arms.

On each side of the center of the rear axle housing is fixed an upwardly extending bracket 47 carrying a journal 48 on which an arm 49 is pivotally mounted. These arms extend upwardly and rearwardly from the housing and terminate in hollow portions 50 closed by threaded abutments 51. Within the hollow portions of each of these arms is arranged a pair of heavily loaded opposed springs 52, and between each pair of such springs a socket bearing 54 is slidably mounted. Carried by each socket bearing is the ball end 55 of an arm, such arms being mounted on brackets 56 fixed on the frame cross member 12 above the transverse spring 40. The arms are arranged to extend relatively at an angle to the vertical and also laterally.

The heavily loaded opposed pairs of coil springs 34 or 52, associated with the suspension systems herein described, have the effect of restricting relative vertical pivotal movement of the axle structures and their links about journals 24. As a consequence, the axle and the links move vertically substantially as a rigid unit that pivots about the link journals 22. In this manner the axle structure, when moving vertically, travels on an arc struck from the points where the links pivot to the frame and, as a consequence, the universal joints 46 will move vertically a shorter distance than the rear portion of the axle structure. Because of this reduction in propeller shaft movement in a vertical direction relative to the axle, the body can be located close to the ground without elevating a portion of the floor to provide a tunnel to allow for vertical propeller shaft movement.

The arms 20 of the links are arranged to extend longitudinally of the main frame and serve to take the driving and braking torque and it will be noted that the loaded springs 34 or 52 serve to cushion such torque forces. The arms 19 of the links serve as struts or radius elements and with the arms 20 resist relative movement of the axle and frame in a direction transversely of the vehicle. In addition to taking driving and braking torque the links serve as supports for the springs 26 or 40.

Ordinarily vehicle bodies tilt or roll transversely when curved roads are encountered, and it is common practice to provide an anti-roll bar or rod between the frame and the axle or suspension. With the present invention, side tilting or roll of the body is resisted within safe limits by the connections between the axle structure and the frame. The pairs of opposed springs 34 or 52 at the opposite sides of the vehicle will function one pair against the other to resist roll of the body. It will also be obvious that the V-type of links pivoted, as described herein, to the axle structure and frame will resist lateral drift or sway of the body relative to the axle structure so that friction in the supporting springs ordinarily required for this purpose can be reduced to provide a softer ride.

The arrangement and association of the shock absorbers with the axle structure and the frame will resist any axle oscillations allowed by the heavily loaded coil springs 34 or 52, such function being in addition to the normal function of resisting vertical movements of the axle structure relative to the frame. In this connection it is preferable that the shock absorbers be arranged so that their axes are substantially perpendicular to the lever arm extending from the journal of link arms 20 on the pedestals, and that the lower ends of the shock absorbers be pivoted to the pedestals on such lever arms.

The connections between the frame and axle structure also serve to lessen body dive normally resulting from brake application. As shown in Fig. 3, the transverse point of the vehicle center of gravity is indicated at 60 and the link structures shown in Figs. 1 and 2 are pivoted to the frame at their front ends on straight lines 59 extending from the center of gravity to the wheel portions 61 engaging the ground. Due to the loaded opposed coil springs 34, the axle structure and links become substantially rigid units and when braking occurs such units will cause the body center of gravity to swing on an arc struck from the bearing points 61 of the wheels instead of swinging from an advanced center of gravity as it does with conventional suspension. In this manner the distance between the center of gravity and the bearing points of the wheels shorten upon brake application so that vertical tilting of the body at both the front and rear is controlled within relatively short limits.

It will be seen that the present system of connection between the axle structure and body of a vehicle requires few parts and such parts serve a plurality of purposes. The loaded opposed coil springs locate the axle structure in exact relation to the links when the vehicle is on a level surface and whenever both rear wheels are rising or falling together. The loaded springs allow a certain flexibility to the drive, known as "Hotchkiss" type, they take the place of the anti-roll bar usually employed and they assist in limiting body dive upon the application of the brakes. The links function as torque members, radius rods, spring support levers, transverse body sway or drift resisting means, and as a part of the side body tilt-resisting mechanism.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a motor vehicle, the combination of a frame, an axle, and a pair of suspension means located one on each side of the vehicle and each comprising a longitudinally extending link pivoted at one end to the frame and adjacent the other end to the axle, spring means supporting the frame on the link, and a pair of opposed loaded coil springs carried by the axle, said link having the end portion beyond the pivotal connection with the axle extending between said pair of coil springs.

2. In a motor vehicle, the combination of a frame, a transversely extending axle means, and suspension means adjacent each end of the axle and connecting it with said frame, each suspension means comprising a longitudinally extending link pivoted at the front end to the frame and adjacent the rear end to the axle, a coil spring supporting the frame on an intermediate portion of the link, and spring means associated with the axle and rear end of the link for normally maintaining the same in a predetermined pivotal relationship.

3. In a motor vehicle, a frame, a transversely extending driven axle structure having road wheels associated therewith, pedestals fixed to and beneath the axle structure, transversely spaced longitudinally extending links pivoted to the frame at their forward end and to the pedestals adjacent their rear end, spring means acting between the frame and the links resisting upward movement of the axle structure, and a pair of load springs carried by each pedestal rearwardly of the pivotal connections of the links therewith, said links extending rearwardly between the adjacent pair of loaded springs and being influenced thereby to normally maintain a definite relationship with the axle structure and to cushion the drive from the axle structure to the links.

4. In a motor vehicle, a frame, a transversely extending driven axle means having road wheels associated with the ends thereof, depending transversely spaced pedestals fixed to the axle means, link means each pivoted at the rear end to a pedestal and at the forward end to the frame, spring means acting between each link means and the frame, extensions at the rear ends of the link means, loaded spring means carried by the pedestals acting upon said extensions, and direct acting shock absorber means pivoted to the frame and pivoted to the pedestals at the rear of and below the link pivots.

5. In a motor vehicle, a frame, a transversely extending driven axle means including a housing, a longitudinally extending V-type link at each side of the vehicle, the apex of the links being at the front, pivot means connecting the apex of the links with the underside of the frame, pivot means connecting the rear ends of the links to the underside of the axle housing, and spring means disposed to act between the frame and intermediate portions of the links.

6. In a motor vehicle, the combination with a frame and a transversely extending axle housing, of suspension mechanism comprising a pair of links pivoted to the axle housing and to the frame, a transversely extending spring having the central portion fixed to the frame and the ends connected with the links between their pivoted portions, and coupling means associated with the axle housing and the frame acting to yieldingly oppose oscillations of the axle about a transverse axis.

7. In a motor vehicle, a driven propeller shaft, a transversely extending axle, a housing for the axle, a universal joint drivingly connecting the axle and the propeller shaft, a pair of longitudinally extending spaced links pivoted at their forward ends to the frame and at their rear ends to the housing, spring means intermediate the links and the frame opposing relative vertical movement thereof, and means operative to rock said housing about its axis upon relative vertical movement of said frame and housing whereby the rise and fall of the universal joint will be less than that of the axle.

8. In a motor vehicle, a driven axle, a transversely extending housing for the axle, spaced longitudinally extending link means pivotally connecting the axle with the frame, low friction springs between the link means and the frame, transversely spaced direct acting shock absorbers connecting the housing and the frame, and resilient means acting between the axle housing and the frame opposing fore and aft pivotal movement of the axle housing.

9. In a motor vehicle having a frame, a driven axle housing beneath the frame, links pivotally connecting the housing with the frame and spring means between the frame and links, the combination of link extensions and opposed loaded coil springs carried by the housing acting on the extensions to restrict relative pivotal movement of the housing and links.

10. In a motor vehicle, a frame, a transversely extending axle housing beneath the frame, a pair of spaced links pivotally connecting the housing and the frame, resilient means opposing relative vertical movement of the housing and the frame, and telescoping shock absorbers pivoted to the housing and the frame, the pivots for the shock absorbers being spaced from the link pivots and the axes of the shock absorbers being on a line normal to a line between the pivotal connections of the shock absorbers and the links on the housing.

11. In a motor vehicle, a frame, a driven axle carrying housing, transversely spaced link means pivoted at one end to the frame and at the other end to the housing, a transversely extending leaf spring connected at its ends to the link means and centrally to the frame, and loaded spring means acting to retain the link means and the housing in a predetermined pivotal relationship.

12. In a motor vehicle, a frame, a driven axle housing extending transversely of and below the frame, spaced link means pivoted to the frame and the axle housing, spring means between the link means and the frame opposing relative vertical movement thereof, a pair of transversely spaced rods pivoted to the housing at their forward end, opposed loaded coil springs in the other end of each of said rods, and arms fixed with said frame and engaged by said loaded springs.

13. In a motor vehicle, a frame, a transversely extending driven axle housing, a pair of unitary transversely spaced link structures each having a torque arm extending substantially parallel with the longitudinal centerline of the vehicle and a radius arm extending at an angle to the torque arm, means pivoting the arms to the housing, means pivoting the other end of the link structures to the frame, spring means acting between the link structures and the frame to oppose relative vertical movement thereof, and means opposing relative pivotal movement of the housing and link structures.

14. In a motor vehicle, a frame, a driven axle housing extending transversely of and below the frame, spaced link means pivoted to the frame and the axle housing, spring means between the link means and the frame opposing relative vertical movement thereof, a pair of transversely spaced rods pivoted to the housing at their forward end, opposed loaded coil springs in the other end of each of said rods, and arms fixed with said frame and engaged by said loaded springs, said rods being inclined vertically and extending at an angle relatively.

15. In a motor vehicle, a frame, a transversely extending driven axle having wheels fixed thereto, a housing for the axle, a pair of transversely spaced links pivoted at their forward ends to the frame and at their rear ends to the housing, the forward pivots of the links being located on a straight line between the vehicle center of gravity and the bearing portions of the driven wheels, and means substantially opposing pivotal movement of the housing and rear ends of the links whereby the center of vehicle gravity is constrained to pivot about the bearing portions of the driven wheels when the vehicle is braked.

16. In a motor vehicle, a frame, a transversely extending driven axle carrying housing beneath the frame, a pair of transversely spaced link members pivoted at their forward end to the housing and at their rear end to the frame, spring means between the links and the frame opposing relative vertical movement thereof, and a direct acting shock absorber between the housing and the frame in advance of each link.

FRANK C. BEST.